(12) United States Patent
Buehler et al.

(10) Patent No.: US 8,340,059 B2
(45) Date of Patent: Dec. 25, 2012

(54) RESPONSE SYSTEM AND METHOD WITH DYNAMIC PERSONALITY ASSIGNMENT

(75) Inventors: William S. Buehler, Zeeland, MI (US);
Harry G. Derks, Holland, MI (US);
Michael B. Hall, Holland, MI (US);
Troy A. Redder, Grand Haven, MI (US);
David L. Ramon, Pinckney, MI (US);
Michael S. Glass, Conklin, MI (US)

(73) Assignee: Fleetwood Group, Inc., Holland, MI (US)

( * ) Notice: Subject to any disclaimer, the term of this patent is extended or adjusted under 35 U.S.C. 154(b) by 1105 days.

(21) Appl. No.: 12/191,484

(22) Filed: Aug. 14, 2008

(65) Prior Publication Data
US 2009/0040183 A1 Feb. 12, 2009

Related U.S. Application Data

(63) Continuation-in-part of application No. 11/163,008, filed on Sep. 30, 2005, now Pat. No. 7,746,820, which is a continuation-in-part of application No. 12/127,254, filed on May 27, 2008.

(60) Provisional application No. 60/615,673, filed on Oct. 4, 2004, provisional application No. 60/944,961, filed on Jun. 19, 2007, provisional application No. 60/964,674, filed on Aug. 14, 2007.

(51) Int. Cl.
| | |
|---|---|
| *G05B 11/01* | (2006.01) |
| *G08C 19/16* | (2006.01) |
| *G08C 19/12* | (2006.01) |
| *H04L 12/16* | (2006.01) |
| *H04Q 11/00* | (2006.01) |
| *H04B 7/005* | (2006.01) |
| *H04W 4/00* | (2009.01) |
| *H04H 20/67* | (2008.01) |
| *H04J 3/00* | (2006.01) |
| *H04J 99/00* | (2009.01) |

(52) U.S. Cl. ............... 370/338; 340/12.51; 340/13.26; 370/270; 370/278; 370/339; 370/345; 370/546

(58) Field of Classification Search .................... None
See application file for complete search history.

(56) References Cited

U.S. PATENT DOCUMENTS 5,273,437 A 12/1993 Caldwell et al.
(Continued)

FOREIGN PATENT DOCUMENTS

WO 95/34963 A1 12/1995

OTHER PUBLICATIONS

Commonly assigned co-pending U.S. Appl. No. 11/163,008, filed Sep. 30, 2005, entitled Response System and Method With Dynamic Personality Assignment.

(Continued)

*Primary Examiner* — Hassan Phillips
*Assistant Examiner* — Lonnie Sweet
(74) *Attorney, Agent, or Firm* — Gardner, Linn, Burkhart & Flory, LLP

(57) ABSTRACT

A response system and method of receiving remotely entered user input selections at a central location includes providing at least one base unit and a plurality of response units. A user input selection is received with each of the response units. The user input selection is communicated to the at least one base unit utilizing wireless communication. Personality data is received at each of the response units. The at least one base unit communicates with each of the response units according to the personality data of the particular one of the response units to receive a user input selection. The personality data is received by an individual one of the response units communicating with the at least one base unit at close proximity to provide personality data to that response unit.

30 Claims, 3 Drawing Sheets

U.S. PATENT DOCUMENTS

| | | | |
|---|---|---|---|
| 5,379,213 | A | 1/1995 | Derks |
| RE35,449 | E | 2/1997 | Derks |
| 5,724,357 | A | 3/1998 | Derks |
| 6,021,119 | A | 2/2000 | Derks et al. |
| 6,070,084 | A | 5/2000 | Hamabe |
| 6,289,222 | B1 | 9/2001 | Cue et al. |
| 6,477,154 | B1 | 11/2002 | Cheong et al. |
| 6,591,103 | B1 | 7/2003 | Dunn et al. |
| 6,665,000 | B1 | 12/2003 | Buehler et al. |
| 6,807,266 | B2 | 10/2004 | Tripathi et al. |
| 6,895,213 | B1 | 5/2005 | Ward |
| 7,008,027 | B2 | 3/2006 | Kelley et al. |
| 7,149,183 | B2 | 12/2006 | Hammel et al. |
| 7,277,671 | B2 | 10/2007 | Glass et al. |
| 7,362,757 | B2 | 4/2008 | Griswold et al. |
| 7,746,820 | B2 * | 6/2010 | Buehler et al. ............ 370/328 |
| 2002/0031755 | A1 * | 3/2002 | Lo et al. ................. 434/351 |
| 2002/0143415 | A1 | 10/2002 | Buehler et al. |
| 2003/0153321 | A1 | 8/2003 | Glass et al. |
| 2003/0153347 | A1 | 8/2003 | Glass et al. |
| 2003/0215780 | A1 | 11/2003 | Saar et al. |
| 2003/0236891 | A1 | 12/2003 | Glass et al. |
| 2004/0004735 | A1 * | 1/2004 | Oakeson et al. ............ 358/1.15 |
| 2004/0033478 | A1 | 2/2004 | Knowles et al. |
| 2004/0229642 | A1 | 11/2004 | Derks et al. |
| 2006/0033608 | A1 * | 2/2006 | Juels et al. ................. 340/10.1 |
| 2006/0072497 | A1 | 4/2006 | Buehler et al. |
| 2007/0011040 | A1 | 1/2007 | Wright et al. |
| 2007/0042724 | A1 | 2/2007 | Derks |

OTHER PUBLICATIONS

Commonly assigned co-pending U.S. Appl. No. 12/127,254, filed May 27, 2008, entitled Audience Response System and Method With Multiple Base Unit Capability.

Office Action for U.S. Patent Application Publication No. 2006/0072497 A1, published on Apr. 6, 2006, entitled Response System and Method With Dynamic Personality Assignment.

Office Action for U.S. Patent Application Publication No. 2007/0042724 A1, published on Feb. 22, 2007, entitled Asynchronous Response System With Acknowledge.

* cited by examiner

RESPONSE SYSTEM AND METHOD WITH DYNAMIC PERSONALITY ASSIGNMENT

CROSS REFERENCE TO RELATED APPLICATIONS

This is a continuation-in-part application of U.S. patent application Ser. No. 11/163,008, filed on Sep. 30, 2005, which claims the benefit of U.S. patent application Ser. No. 60/615,673, filed on Oct. 4, 2004; this application is a continuation-in-part of U.S. patent application Ser. No. 12/127,254, filed on May 27, 2008, which claims the benefit of U.S. patent application Ser. No. 60/944,961, filed on Jun. 19, 2007; and this application claims the benefit of U.S. patent application Ser. No. 60/964,674, filed on Aug. 14, 2007, the entire disclosures of which are hereby incorporated herein by reference.

BACKGROUND OF THE INVENTION

The present invention is directed to response systems for retrieving responses entered by users with a keypad, known as a response unit. The invention is particularly useful with wireless response systems, such as systems utilizing radio frequency communication, infrared communication, and the like, for communicating responses.

Response units each include personality data that allows the response units to communicate with the base unit or a plurality of coordinated base units. The personality data may include a time slot in which the response unit is set to transmit response data following receipt of a base packet transmission. It may also include a base identification (ID) assigned to the response unit. In such a system, the response units and base unit(s) are set to communicate according to a particular base ID, such as on a common frequency or channel, or, in the case of spread spectrum communication, a common frequency hopping sequence.

SUMMARY OF THE INVENTION

A response system and method of receiving remotely entered user input selections at a central location, according to an aspect of the invention, includes providing at least one base unit and a plurality of response units. A user input selection is received with each of the response units. The user input selection is communicated to the at least one base unit utilizing wireless communication. Personality data is received at each of the response units. The at least one base unit communicates with each of the response units according to the personality data of the particular one of the response units. The personality data is received by an individual one of the response units communicating with the at least one base unit at close proximity to provide personality data to that response unit.

The at least one base unit may include a proximity transmitter. The proximity transmitter communicates with an individual one of said response units at close proximity to provide the personality data to that response unit. The proximity transmitter may communicate with an individual one of said response units at a range of less than approximately three (3) feet and even at a range of less than approximately 12 inches. The at least one base unit may include a base unit other than the proximity transmitter, with the response units communicating with the other base unit at a distance greater than close proximity to communicate user input selections to that base unit after personality data is supplied to those response units.

The response units may receive personality data by listening for communication from the at least one base unit at close proximity to provide personality data to that response unit. Alternatively, each of the response units may receive personality data by transmitting a signal to the at least one base unit at close proximity requesting personality data for that response unit.

The proximity transmitter may communicate with an individual response unit with a low frequency inductive field. Alternatively, the proximity transmitter may communicate with an individual response unit with a magnetic field. Alternatively, the proximity transmitter may include a radio frequency identification tag or a radio frequency identification tag reader. Alternatively, the proximity transmitter may include an optical bar code or an optical bar code reader.

The at least one base unit may include a common base unit that communicates with an individual one of the response units at close proximity to provide personality data to that response unit and communicates with the response units at a distance greater than proximity to receive the user input selections from those individual ones of the response units.

These and other objects, advantages and features of this invention will become apparent upon review of the following specification in conjunction with the drawings.

DESCRIPTION OF THE PREFERRED EMBODIMENT

Figure 1:
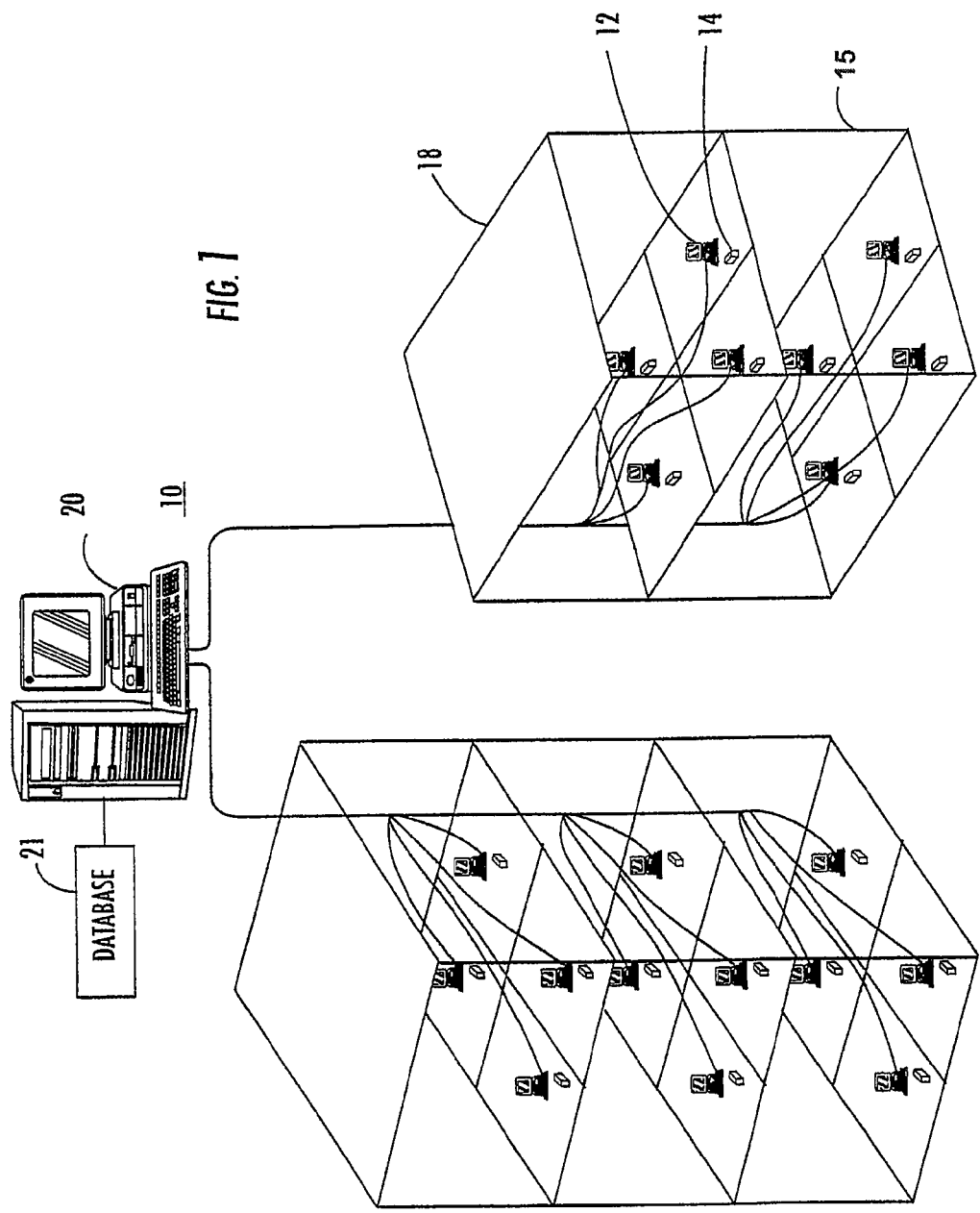
FIG. 1 is a perspective view of a response system according to an aspect of the invention.

Referring now specifically to the drawings, and the illustrative embodiments depicted therein, a response system 10 may include a single base unit 12 or a plurality of base units 12 and a plurality of response units 14, each of which is provided to a user (FIG. 1). Base unit(s) 12 is generally adapted to be positioned in a room 15, such as a classroom, of a building 18, such as a campus building, an auditorium, a business conference room, or the like. The base unit(s) may be connected with a personal computer, as illustrated in FIG. 1, or may be programmed to operate directly from a network. While only one response unit 14 is illustrated with each room, it should be understood that many response units may be present at any room 15 at a given time and may be carried from room-to-room as the user travels from class-to-class. While the invention is illustrated in a classroom setting, such as at a university, it may also be applied to corporate settings or other applications as would be apparent to the skilled artisan. In the illustrative embodiment, base units 12 and response units 14 may be provided according to the principles set forth in commonly assigned U.S. Pat. Nos. Re. 35,449; 5,724,357; 6,021,119; 6,665,000; and 7,277,671 and U.S. Published Patent Application Nos. 2003/0153347 A1; 2003/0153321 A1; 2003/0236891 A1; 2004/0229642 A1; 2006/0072497 A1 and 2007/0042724 A1, the disclosures of which are hereby collectively incorporated herein by reference in their entireties.

Communication between base units 12 and response units 14 may be synchronous under the control of the respective base unit or asynchronous in which the transfer of user responses from the response unit to the base unit is initiated by the respective response unit. Response system 10 may include a host computer system 20 interconnecting base units 12 in an enterprise network, as illustrated in FIG. 1. However, it should be understood that the illustrated embodiments may be carried out with base units 12 operating in a standalone fashion or with data being manually entered in the respective base unit as supplied from a central source. Standalone base units may be connected with a personal computer for running related software applications, as is conventional. Other variations will be apparent upon further details being set forth below.

Figure 2:
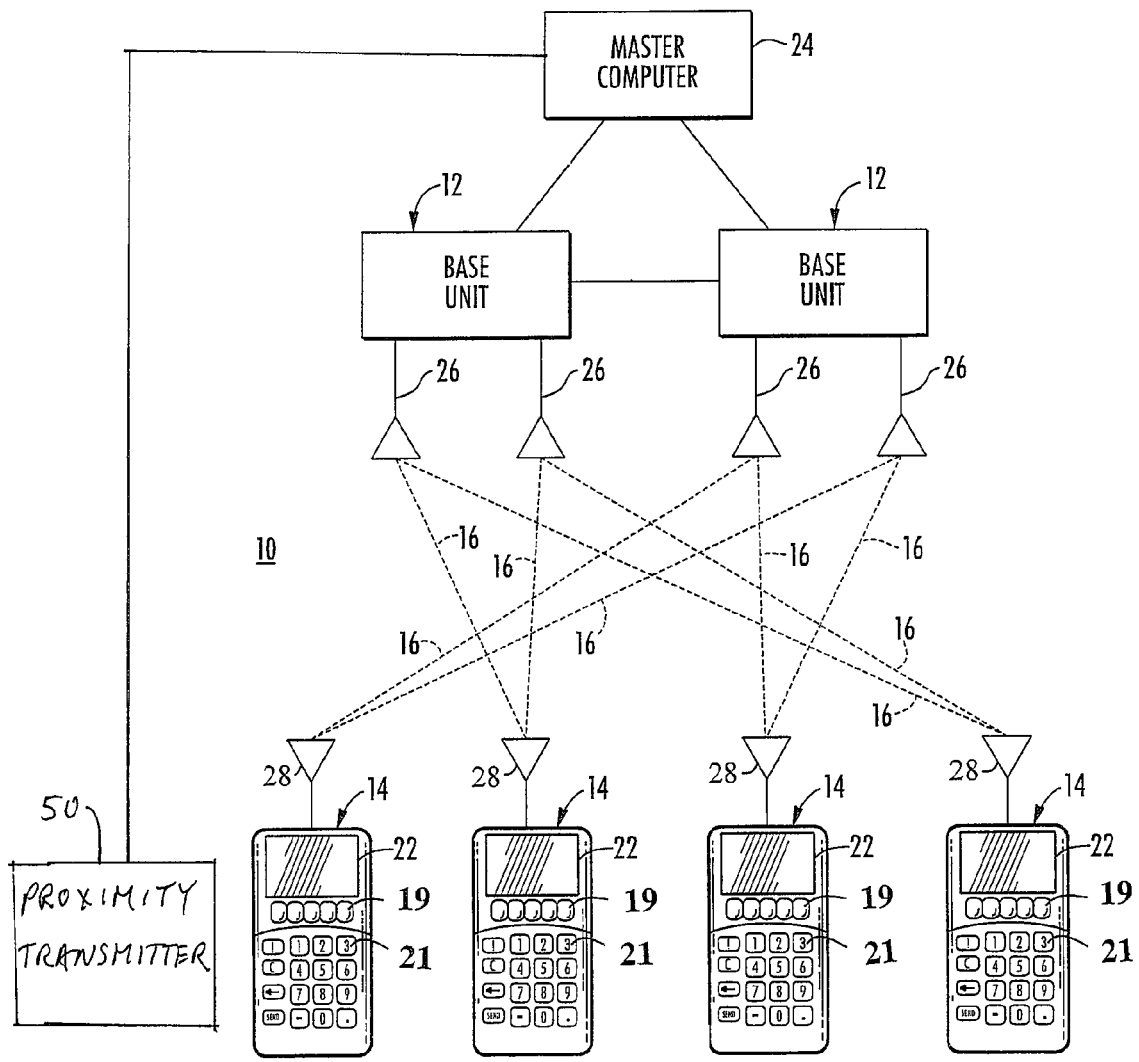
FIG. 2 is a block diagram of a portion of the response system in FIG. 1.

Handheld units 14 communicate with the base unit(s) over one or more wireless communication links 16 (FIG. 2). The base unit(s) may send polling signals over wireless communication link 16 when operating synchronously and the response units send response data to the base unit over the wireless communication link(s) in response to the polling signals. The response data is entered in the respective response unit by a user. An illustration of the protocol of the communication between base unit 12 and the response unit may be generally as disclosed in detail in commonly assigned U.S. Pat. No. Re. 35,449 for a REMOTE TWO-WAY TRANSMISSION AUDIENCE POLLING AND RESPONSE SYSTEM; U.S. Pat. No. 5,727,357 for a REMOTE RESPONSE SYSTEM AND DATA TRANSFER PROTOCOL; and U.S. Pat. No. 6,021,119 for a MULTIPLE SITE INTERACTIVE RESPONSE SYSTEM, the disclosures of which are hereby incorporated herein by reference. Each response unit 14 may include user input devices, such as a keypad 21, a series of soft keys 19, or the like. Each response unit 14 may additionally include a display 22 for displaying information to the user, as well as indicating user selections. Base unit 12 may be connected with a command computer 24 in order to provide top level control of wireless response system 10, as well as to run software applications to analyze data produced by wireless response system 10.

In the illustrative embodiment, two base units 12 are illustrated, each with a pair of synchronized transceivers 26. However, it should be understood that for certain applications, only one base unit 12, or more than two base units 12, may be utilized and base unit 12 may utilize only one transceiver 26 or more than two transceivers 26. Each response unit 14 includes a transceiver 28 for wireless communication with base transceiver(s) 26 over wireless communication link(s) 16.

Each response unit has a personality assigned to it in order to communicate with one or more base units. The personality may include an address, such as a time slot in which the response unit is set to transmit data in response to receipt of a base packet. In order to have communication between a response unit and a particular base unit, they must both be communicating on the same base ID such as a common frequency or channel and may include allowing for selecting among multiple communication channels. Alternatively, a spread spectrum communication protocol, such as a frequency hop sequence or direct sequence spread spectrum, may be utilized in which the base unit and the response unit utilize a base ID in the form of a common spread spectrum setting in order to communicate. While various modes of communication are possible between response unit 14 and base unit 12 to exchange response data, in the illustrative embodiment, radio frequency (RF) wireless communication is utilized. An advantage of RF communication is that it is robust and capable of high-speed data communication.

Figure 3:
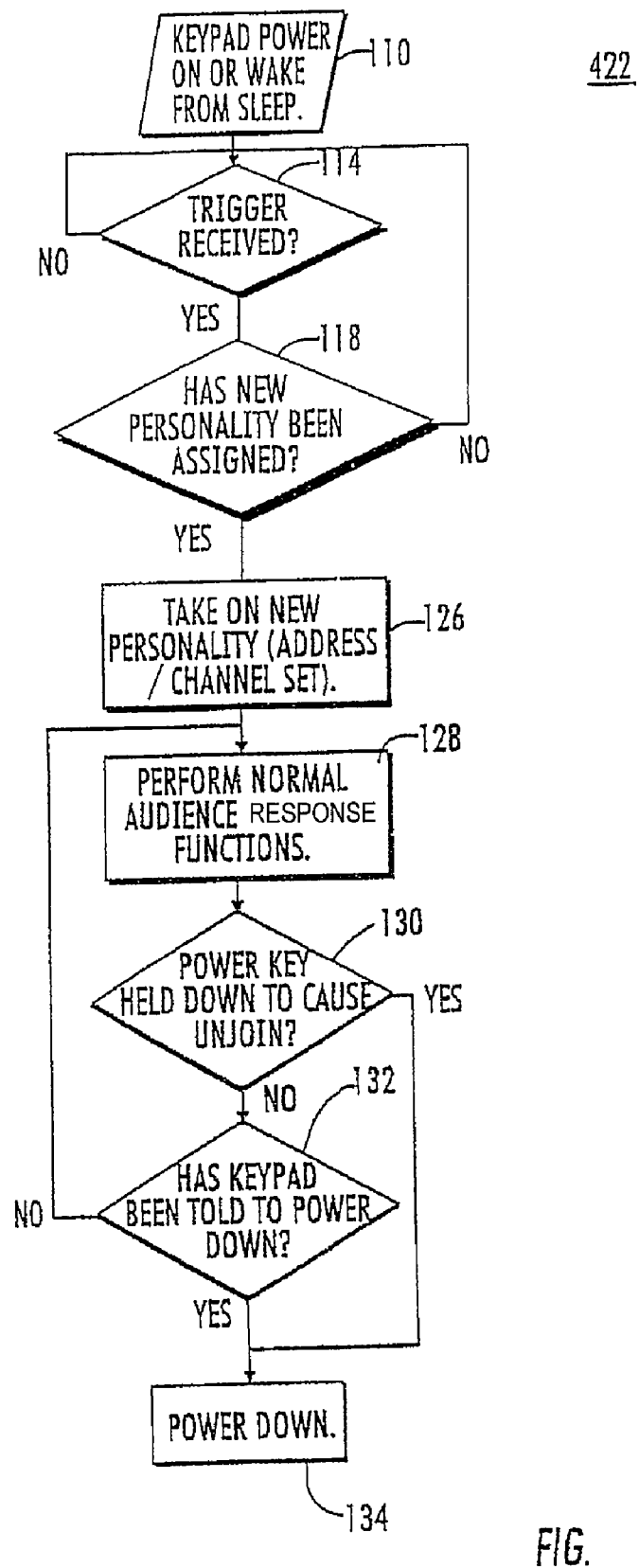
FIG. 3 is a block diagram of a method of dynamically assigning personality data using a proximity transceiver.

In a dynamic personality assignment process 422, the response unit may obtain personality data from a proximity transmitter 50, such as a low power transmitter, that is positioned in a manner to encounter generally one response unit at a time and having an operating range sufficiently short to only communicate with one response unit at a time (FIG. 3). An example of such a proximity transceiver would be a transceiver positioned at a doorway, or the like, through which the user passes. Alternatively, the proximity transceiver may be positioned at a desk at which the user may sit or a work surface at which the user works. Other examples will be apparent to the skilled artisan. The response units are able to distinguish signals sent by the proximity transmitter from signals sent by the RF transceiver in the base unit. This may be accomplished, for example, by using a different packet configuration sent by these units. Alternatively, the proximity transmitter may be set to transmit on a dedicated frequency channel or according to a dedicated frequency hopping scheme. While close proximity may mean approximately three feet or less, or even approximately 12 inches or less, it may extend to a major portion of the normal communication range of the wireless communication channel between the base unit(s) and the response units. For example, close proximity in certain embodiments may be up to $\frac{2}{3}$ to $\frac{3}{4}$ of the range at which the response units transmit data, such as user response data to the base unit(s).

Process 422 begins at 110 with the response unit being powered on or awoken from a sleep state. It is determined at 114 whether the response unit has received some form of transmission from the proximity transmitter that dynamically provides new personality data. If so, the response unit takes on the new personality data associated with that serial number in the base packet at 126 and switches to a mode to perform normal audience response functions at 128. The response unit then waits for either a keypress power-down at 130 or, otherwise, receives a power-down signal at 132, at which time the response unit powers down at 134.

The personality data may be a particular communication address dynamically assigned to the response unit. This is particularly useful for retrieving of response data according to an address of the response unit. Alternatively, the personality data may include a time slot assignment or other timing reference for use by the response unit in responding to a base packet sent by the base unit, such as in a time-division-multiplexing (TDM) protocol. The personality data may include a channel set to a particular frequency to communicate with the base unit or a base association value. The base association value is particularly useful in spread spectrum communication, particularly for frequency hopping spread spectrum communication. The personality data may be a new serial number of the response unit to replace the serial number that is assigned to the response unit at the time of manufacture. The personality data may additionally be data that allows the response unit to communicate with an individual base unit in the particular room, with multiple base units in an enterprise-wide control structure or with multiple base units, regardless of the control structure. The above are examples of personality data. Other examples will be apparent to the skilled artisan.

The base transmission may include a sync byte to coordinate responses of a plurality of the response units and a plurality of characters that pertain to particular remote response units as disclosed in commonly assigned U.S. Pat. No. 5,724,357 entitled REMOTE RESPONSE SYSTEM AND DATA TRANSFER PROTOCOL, the disclosure of which is hereby incorporated herein by reference. With such protocol, the response units include a personality, such as a time slot assigned to that response unit. The response unit sends a response transmission measured from the sync byte sent in the base transmission in its time slot. The time slot assignment or personality may be assigned by the base unit during a join mode as disclosed in U.S. Patent Application Publication No. 2006/0072497 entitled a RESPONSE SYSTEM AND METHOD WITH DYNAMIC PERSONALITY ASSIGNMENT, the disclosure of which is hereby incorporated herein by reference. In such a system, the response unit sends to the base unit a request to be added to the system. The join mode may be mutually exclusive with a normal polling mode in which user-entered responses are sent to the base unit. During the join mode, the user presses a button on the response unit, which, when pressed in the proximity of a base unit, will initiate a communication with the base unit for a personality assignment. The base unit will issue a personality to the corresponding response unit.

As illustrated in commonly assigned U.S. patent application Ser. No. 12/127,254, filed May 27, 2008, by Buehler et al. entitled AUDIENCE RESPONSE SYSTEM AND METHOD WITH MULTIPLE BASE UNIT CAPABILITY, the disclosure of which is hereby incorporated herein by reference, the joining may be accomplished through an attenuated RF communication channel with the base unit. Therefore, the response unit will be in close proximity to the joining base unit. Therefore, a base unit 12 may be the proximity transmitter 50. The same base unit may have a full power channel for sending base transmissions and receiving data transmissions from the response units including user input data. Alternatively, the base unit that operates as a joining base unit may transmit both personality data and polling signals at a common power level. In this embodiment, the response unit will only react to the personality data when the power level of the base transmission indicates that the response unit is in close proximity to the base unit. This may be accomplished, for example, by the response unit processing a received signal strength indicator (RSSI) of the received base transmission.

In the illustrated embodiment, the base unit may issue addresses sequentially as they are requested up to a limit of available addresses. The response unit not having a personality assigned may be referred to as neutralized. A response unit that has been assigned a personality can be neutralized during normal polling from a command from the base unit or with a manual power-down of the response unit. Pressing of a personality requesting key on a neutralized response unit will light a display on the response unit until a personality has been assigned. Once the response unit receives a personality, pressing this button again immediately will not affect the newly assigned personality. However, once a re-joined timeout period has passed, the response unit will be able to obtain a new personality from the base unit.

The response unit may be capable of retaining its personality during a sleep mode. However, if the response unit loses power, through an intentional power-down or by the replacement of batteries, the response unit may be programmed to lose its personality and a new personality can be obtained during the join mode. The response unit may also be programmed to include a timeout period. Once the unit is in a sleep mode beyond the timeout period, the new personality will be deleted.

In an alternative embodiment of using a short range method of assigning a personality to a response unit, a hybrid approach is provided between a static address assigned to the response unit and a dynamic address assigned to the response unit. Each response unit may either have a fixed address already assigned to it or not be initially configured. A person with a computer and software application would take the response unit and "swipe" it past proximity transmitter 50 in the form of a short range (for example, 12" or less) communicator that would then cause the response unit to accept a new static address and channel. This short range communication link could be done using one, or a variation of, the following techniques:

1) A keypad button is pressed on the response unit causing it to listen for short range RF transmissions assigning a new personality to that response unit;

2) A keypad button is pressed on the response unit causing it to transmit a signal, such as an RF burst requesting personality information.

3) A low frequency inductive field is used so that the response unit can receive a signal telling it to take on a new identity. The inductive field could cause the response unit to wake up from a low power "sleep" state and either receives the data over that short range inductive link or to listen for a transmission through the RF link. This may be accomplished by providing an inductive field sensor that is arranged to interrupt the processor of the response unit. The inductive field sensor may be separate from the RF transceiver used by the response unit for RF communication with the base unit.

4) A magnetic field used to trigger the response unit causing it to power up from a sleep state and listen to receive the personality assignment from the RF link. This may be accomplished by providing a magnetic field sensor that is arranged to interrupt the processor of the response unit. The magnetic field sensor may be separate from the RF transceiver used by the response unit for RF communication with the base unit.

The ability of the proximity transmitter 50 to cause the response unit in proximity thereto to wake up from a low power sleep mode may avoid the necessity for the response units to repeatedly and frequently awake themselves from the low power mode to listen for transmissions from the base unit(s). Such repeated awakening and switching on of the transceiver of the response unit creates increased battery drain. Thus, the proximity transmitter may facilitate extended battery life between charges which is important for remote response systems.

In the illustrative embodiment, proximity transmitter 50 may include a radio frequency identification (RFID) reader and each response unit and RFID tag which may either be an active tag or a passive tag. Alternatively, a barcode on the response unit could be read by a barcode reader. This allows the proximity transmitter to be apprised of the identity of the response unit in its proximity and to thereby send the serial number for that response unit and associated new personality data to allow joining of that response unit to the base unit(s). Alternatively, the barcode or RFID reader may be used, for example, to scan the identification badge of the user in order to associate the user with the personality data being given to the response unit in the possession of the user by a separate proximity transmitter.

In a somewhat related embodiment of a proximity transmitter, each desk or work surface in a classroom may include a tag, such as an RFID tag or barcode, that the response unit may read and takes on the personality data associated with the base unit in that room. The proximity transmitter may alternatively be connected with the base unit and forward personality data from the base unit. Alternatively, the proximity transmitter may be a nearby response unit acting as a signal repeater. Other embodiments will be apparent to the skilled artisan.

Changes and modifications in the specifically described embodiments can be carried out without departing from the principles of the invention which is intended to be limited only by the scope of the appended claims, as interpreted according to the principles of patent law including the doctrine of equivalents.

The invention claimed is:

1. A response system, comprising:
a plurality of base units and a proximity transmitter;
a plurality of response units, each of said response units adapted that receives user input selection communicates that user input selection with one of said base units utilizing wireless communication;
each of said response units that receives personality data when in a first mode communicates with one of said base units according to the personality data, the personality data determining which of said base units that particular one of said response units communicates, wherein said base units communicating with said response units according to the personality data of said response units to receive user input selections; and
wherein each of said response units that communicates with said proximity transmitter at close proximity when that response unit is in said first mode is provided personality data to that response unit in order to join that response unit to one of said base units and wherein each of said response units that communicates with the one of said base units to which that response unit is joined when that response unit is in a second mode transmits a user input selection to that one of said base units.

2. The response system as claimed in claim 1 wherein said proximity transmitter is adapted to communicate with an individual one of said response units only at close proximity to provide the personality data to that response unit.

3. The response system as claimed in claim 2 wherein said close proximity is a range of not greater than approximately three (3) feet.

4. The response system as claimed in claim 3 wherein said close proximity is a range of not greater than approximately 12 inches.

5. The response system as claimed in claim 2 wherein each of said response units is adapted to enter said first mode to receive personality data by listening for communication from said proximity transmitter at close proximity to provide personality data to that response unit.

6. The response system as claimed in claim 2 wherein each of said response units is adapted to enter said first mode to receive personality data by transmitting a signal to said proximity transmitter requesting personality data for that response unit.

7. The response system as claimed in claim 2 wherein said proximity transmitter is adapted to communicate with that response unit with a low frequency inductive field when that response unit is in said first mode.

8. The response system as claimed in claim 1 wherein said each of said response units is adapted to transmit a first distance in order to communicate with said proximity transmitter when in said first mode and to transmit at a second distance that is greater than said first distance to communicate user input selections to the one of said base units to which that one of said response units is joined when that one of said response units is in said second mode.

9. The response system as claimed in claim 1 wherein each of said response units is adapted to enter said first mode to receive personality data by listening for communication from said proximity transmitter at close proximity to provide personality data to that response unit.

10. The response system as claimed in claim 1 wherein each of said response units is adapted to enter said first mode to receive personality data by transmitting a signal to said proximity transmitter at close proximity to provide personality data for that response unit.

11. The response system as claimed in claim 1 wherein one of said base units includes a low power transmission channel thereby defining said proximity transmitter that communicates with individual ones of said response units at a particular power level to provide personality data to those ones of said response units and wherein said one of said base units includes a high power transmission channel that communicates with those individual ones of said response units at a power level that is higher than said particular power level to receive the user input selections from those individual ones of said response units.

12. The response system as claimed in claim 1 including a trigger associated with said proximity transmitter in order to place one of said response units in said first mode in response to said trigger.

13. The response system as claimed in claim 12 wherein said trigger includes one chosen from a magnet and a magnetic sensor, wherein said magnet is adapted to generate a magnetic field and said magnet sensor is adapted to sense a magnetic field, wherein each of said response units include the other chosen from a magnet and a magnetic sensor and wherein each of said response units enters said first mode in response to said magnetic field.

14. The response system as claimed in claim 12 wherein said trigger comprises once chosen from a radio frequency identification tag and a radio frequency identification tag reader and wherein each of said response units includes the other chosen from a radio frequency identification tag and a radio frequency tag reader and wherein each of said response units enters said first mode in response to said radio frequency tag reader reading said radio frequency tag.

15. The response system as claimed in claim 12 wherein said trigger comprises one chosen from an optical bar code r and an optical bar code reader and wherein each of said response units includes the other chosen from an optical bar code and an optical bar code reader and wherein each of said response units enters said first mode in response to said optical bar code reader reading said optical bar code.

16. A method of receiving remotely entered user input selections at a central location, said method comprising:
providing a plurality of base units and a proximity transmitter;
providing a plurality of response units, receiving a user input selection with each of said response units and communicating that user input selection to one of said base units utilizing wireless communication;
receiving personality data at each of said response units, including placing individual ones of said response units in a first mode, the personality data determining which of said base units that particular one of said response units communicates, wherein said base units communicating with said response units according to the personality data of the particular response units to receive user input selections; and
wherein said receiving personality data includes each of said response units communicating with said proximity transmitter at close proximity when that response unit is in said first mode to provide personality data to that response unit in order to join that response unit to one of said base units and wherein each of said response units is adapted to communicate with one of said base units to which that response unit is joined when that response unit is in a second mode in order to transmit a user input selection to that one of said base units.

17. The method as claimed in claim 16 wherein said proximity transmitter communicating with an individual one of said response units only at close proximity to provide the personality data to that response unit.

18. The method as claimed in claim 17 wherein said close proximity is a range not greater than approximately three (3) feet.

19. The method as claimed in claim 18 wherein said close proximity is a range of not greater than approximately 12 inches.

20. The method as claimed in claim 17 wherein each of said response units enters said first mode to receive personality data by listening for communication from said at least one base unit at close proximity to provide personality data to that response unit.

21. The method as claimed in claim 17 wherein each of said response units enters said first mode to receive personality data by transmitting a signal to said proximity transmitter requesting personality data for that response unit.

22. The method as claimed in claim 17 wherein said proximity transmitter communicates with an individual response unit with a low frequency inductive field when that response unit is in said first mode.

23. The method as claimed in claim 16 wherein each of said response units transmits up to a first distance in order to communicate with said proximity transmitter when in said first mode and transmits up to a second distance that is greater than said first distance to communicate user input selections to the one of said base units to which that one of said response units is joined when that one of said response units is in said second mode.

24. The method as claimed in claim 16 wherein one of said base units includes a low power transmission channel thereby defining said proximity transmitter that communicates with individual ones of said response units at a particular power level to provide personality data to those ones of said response units and wherein said one of said base units includes a higher power transmitter that communicates with those individual ones of said response units at a power level that is higher than said particular power level to receive the user input selections from those individual ones of said response units.

25. The method as claimed in claim 16 including a trigger associated with said proximity transmitter and including placing one of said response units in said first mode in response to said trigger.

26. The method as claimed in claim 25 wherein said trigger includes one chosen from a magnet and a magnet sensor, wherein said magnet is adapted to generate a magnetic field and said magnet sensor is adapted to sense a magnetic field, wherein each of said response units include the other chosen from a magnet and a magnetic sensor and including placing each of said response units in said first mode in response to said magnetic field.

27. The method as claimed in claim 25 wherein said trigger includes one chosen from a radio frequency identification tag and a radio frequency identification tag reader and wherein each of said response units includes the other chosen from a radio frequency identification tag and a radio frequency tag reader and including placing each of said response units in said first mode in response to said radio frequency tag reader reading said radio frequency tag.

28. The method as claimed in claim 25 wherein said trigger includes one chosen from an optical bar code and an optical bar code reader and wherein each of said response units includes the other chosen from an optical bar code and an optical bar code reader and wherein each of said response units enters said first mode in response to said optical bar code reader reading said optical bar code.

29. The method as claimed in claim 16 wherein each of said response units enters said first mode to receive personality data by listening for communication from said at least one base unit at close proximity to provide personality data to that response unit.

30. The method as claimed in claim 16 wherein each of said response units enters said first mode to receive personality data by transmitting a signal to said at least one base unit at close proximity to provide personality data for that response unit.

* * * * *

UNITED STATES PATENT AND TRADEMARK OFFICE
CERTIFICATE OF CORRECTION

PATENT NO. : 8,340,059 B2  
APPLICATION NO. : 12/191484  
DATED : December 25, 2012  
INVENTOR(S) : William S. Buehler et al.

Page 1 of 1

It is certified that error appears in the above-identified patent and that said Letters Patent is hereby corrected as shown below:

In the Claims:

<u>Column 7</u>  
Line 5, Claim 1, "adapted" should be deleted

Signed and Sealed this  
Twenty-first Day of May, 2013

Teresa Stanek Rea  
*Acting Director of the United States Patent and Trademark Office*